C. J. CHRISTENSEN.
UNIVERSAL JOINT.
APPLICATION FILED MAR. 27, 1919.
1,323,451.
Patented Dec. 2, 1919.
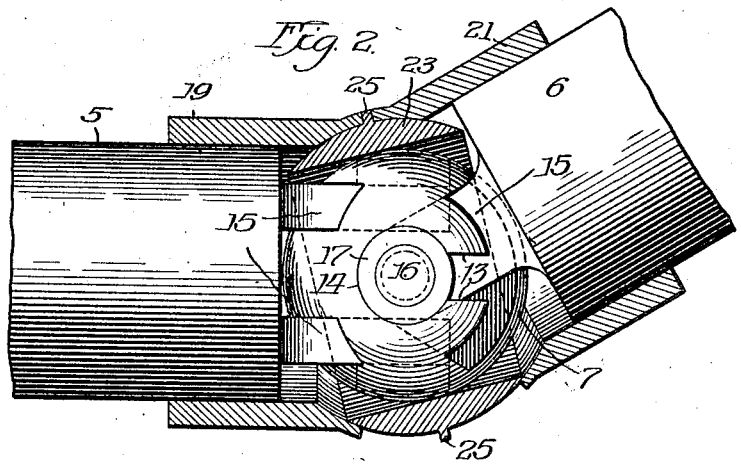
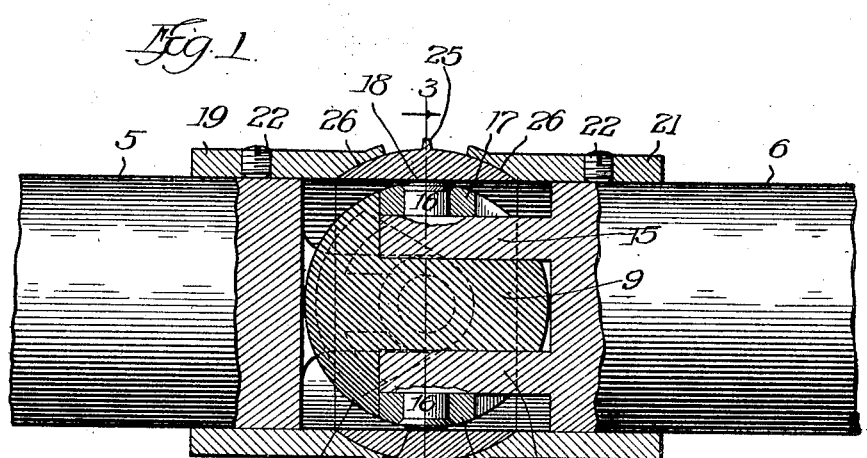
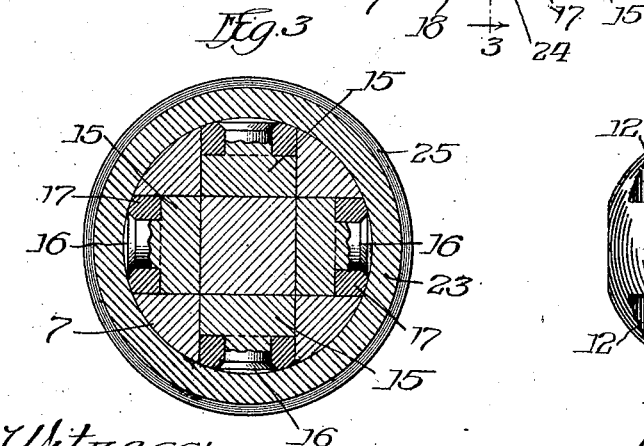
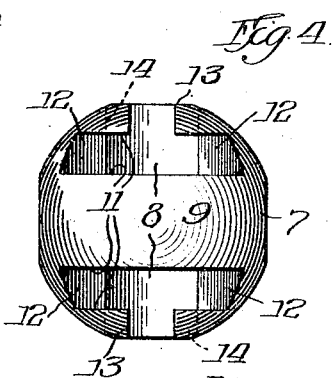
Witness:
Inventor:
Carl J. Christensen
By Ira J. Wilson
Attys

UNITED STATES PATENT OFFICE.

CARL J. CHRISTENSEN, OF ROCKFORD, ILLINOIS.

UNIVERSAL JOINT.

1,323,451.  Specification of Letters Patent.  Patented Dec. 2, 1919.

Application filed March 27, 1919. Serial No. 285,420.

*To all whom it may concern:*

Be it known that I, CARL J. CHRISTENSEN, a subject of the King of Norway, residing at Rockford, in the county of Winnebago and State of Illinois, have invented certain new and useful Improvements in Universal Joints, of which the following is a specification.

This invention relates to universal joints adapted for the transmission of power and particularly adapted for use in automobile and motor truck constructions.

One of the primary objects of the invention is to produce a universal joint which will be extremely strong and durable and in which the strains and wear will not come upon the pivotal connections but will be taken care of by broad, flat wearing surfaces which contribute toward and insure great strength and longevity of the joint.

Another object of the invention is the provision of a universal joint which will be small in diameter so that it will occupy a minimum amount of space and one which will present a smooth exterior which will not endanger any one coming in contact with the joint while it is in operation.

Still another object is to provide a joint which will be entirely incased so as to effectively exclude dust and dirt from the joint and at the same time retain a quantity of lubricant around the joint and prevent its escape.

Another feature of my invention resides in its simplicity of construction, the ease with which it may be assembled and the accessibility of the joint for inspection, lubrication or repairs resulting from the ready removability of the surrounding casing.

Other objects and many of the inherent advantages of my invention will be readily appreciated by those skilled in the art as the same becomes better understood by reference to the following description when considered in connection with the accompanying drawings.

Referring to the drawings.

Figure 1 is a longitudinal sectional view through a joint embodying my invention;

Fig. 2 is a similar view taken at right angles to the showing in Fig. 1, and illustrating the joint in one of its extreme working positions;

Fig. 3 is a transverse sectional view of the joint taken on the line 3—3 of Fig. 1; and Fig. 4 is an elevation looking at one end of the ball member of the joint.

From an inspection of the drawings it will be observed that the joint comprises primarily a pair of shaft members designated 5 and 6, respectively, and a ball member 7 to which the shaft members are pivotally connected in a manner which will be hereinafter explained.

The ball member is provided with two pairs of oppositely disposed sockets and viewing Fig. 4 it will be seen that each pair consists of two similarly shaped sockets 8 arranged in spaced relation so as to provide a solid block 9 between them, each socket having parallel upper and lower walls 11 providing broad bearing surfaces and outwardly diverging walls 12 forming abutment surfaces for a purpose which will be later explained.

The outer wall of each socket is provided with a slot 13 extending toward the diametral center of the ball, which slot, at its inner end, is provided with an annular enlargement 14 disposed diametrically of the ball.

Each shaft member is shaped at its inner end to provide longitudinally extending bifurcations 15 adapted to snugly fit between the bearing surfaces 11 of its pair of ball sockets. Each bifurcation is also provided near its extremity with an outwardly projecting stud 16 of a diameter to slide into the slot 13 so that the bifurcations can be inserted into their sockets, as shown in Figs. 1 and 2. For the purpose of pivotally locking the shaft members to the ball member, I employ bushings 17 which are adapted to fit over the studs 16 and snugly fit the annular enlargements 14 at the bases of the slots 13. These bushings are slipped onto the studs and into the slot enlargement 14 after the shaft bifurcations have been introduced into their respective sockets, and it will be manifest that these bushings, being of greater diameter than the width of the slots 13, will preclude withdrawal of the shaft bifurcations from their sockets. In order to permanently lock the parts together the heads of the studs 16 are riveted over, as indicated at 18, after the bushings have been positioned, and to insure a secure fastening, the bushings are preferably counter-sunk, as shown, to permit considerable expansion of the stud head when it is riveted, thereby securely fastening the bushings on the studs and also enabling a smooth curved contour at the outer ends of the studs to be obtained.

After the two shaft members have been pivotally locked to the ball member in the manner just described, it will be evident that the shaft members are each capable of swinging movement in one plane only, the extent of this movement being limited by the abutment walls 12 against which the sides of the bifurcations 15 will abut when the limit of the swinging movement in each direction is reached. Relative movement in any other plane between the ball member and the shaft members is effectively prevented and obviated by reason of the broad bearing surfaces 11, between which the shaft bifurcations snugly fit. By reason of these broad wearing surfaces the pivots themselves are relieved of all torsional strains and stresses with the result that the normal life of the joint is very great. Since the axes of one pair of slots are disposed at right angles to the axes of the other pair, it will be manifest that swinging movements of the two shaft members takes place at right angles to each other.

For the purpose of inclosing the joint so as to exclude dust and dirt and at the same time to retain lubricant around the joint, I have provided a casing consisting of two sleeve members 19 and 21, respectively, each snugly fitting its respective shaft member to which it is securely attached by a screw stud 22, or other preferred fastening means. These sleeve members project toward each other and the intervening space between their inner ends is closed by a ring member 23 which surrounds the ball member of the joint. This ring member has a flat inner surface and a curved outer surface 24 struck on an arc concentric with the ball 7 and intermediate its edges the ring member is provided with a circumferential flange or rib 25. The inner ends of the sleeve members 19 and 21 are also curved, as indicated at 26, to conform to the curvature of the ring member so that when the shaft members are angled with respect to each other, these sleeve members will telescope with the ring member. When the angling of the shaft members reaches substantially half of the limit of relative movement, the end of the sleeve member will engage the rib 25 whereupon further angling movement of the sleeve member will carry the ring member with it, thus preventing the production of an opening between the edge of the ring member and the end of the sleeve member. In the extreme angling position for which the joint is adapted, the parts will assume the position shown in Fig. 2, from which it will be manifest that in the extreme movements the telescopic relation between the sleeve members and the ring member is maintained and the joint is at all times fully inclosed and protected against the escape of lubricant and against the entrance of dirt.

The joint is readily accessible for purposes of inspection, lubrication or repairs, since by simply loosening one or both of the screw studs 22 one or the other or both of the sleeve members are slipped back on the shaft and the ring 23 may also be slipped back onto the shaft so that the joint is fully exposed.

It is believed that my invention, the construction of one of its preferred embodiments, its mode of operation, and many of its inherent advantages will be readily understood from the foregoing without further description, and it should be obvious that the size, shape, proportion and arrangement of the various parts which have been shown for purposes of illustration may be varied within considerable limits without departing from the spirit of the invention as set forth in the following claims.

I claim:

1. A universal joint comprising a pair of bifurcated shaft members, a ball member provided with inwardly tapered sockets to accommodate the bifurcated ends of said members and providing a solid bearing surface between each pair of said ends, and means for pivotally locking said shaft members to said ball member.

2. A universal joint comprising a ball member provided with two pairs of oppositely disposed sockets, each socket having two bearing walls and two outwardly diverging walls, shaft members each having a bifurcated end disposed in a pair of said sockets, and means whereby each shaft member is pivotally attached to said ball member so as to be capable of swinging movement in one plane only.

3. A universal joint comprising a ball member provided with a pair of sockets each having parallel inner and outer walls providing bearing surfaces, and outwardly diverging walls providing abutment surfaces, a shaft member having parallel longitudinally extending bifurcations, each adapted to fittingly engage in a socket between the bearing walls thereof, and means for pivotally attaching said shaft member to said ball member so as to permit relative movement between said members in one plane only.

4. A universal joint comprising a ball member and a pair of shaft members, said ball member being provided with two pairs of sockets, each socket having parallel guiding walls and diverging abutment walls, the ends of said shaft members being bifurcated to fittingly engage in said sockets and each bifurcation being provided near its end with an outwardly extending stud, the outer wall of each socket being slotted to permit the insertion of said bifurcations in said sockets, and means engaging said studs for pivotally locking the shaft members to said ball member.

5. A universal joint, comprising a ball member provided with two pairs of oppositely disposed sockets, corresponding walls of the sockets of each pair being parallel and the sockets of one pair being normal to the sockets of the other pair, a pair of shaft members provided at their inner ends with longitudinally extending bifurcations adapted to fit said sockets, a stud carried by each bifurcation, the outer wall of each socket being provided with a slot terminating radially of the ball member in an annular enlargement, and a bushing disposed upon each stud within said slot enlargement to pivotally lock said shaft members to said ball member.

6. A universal joint, comprising a ball member provided with two pairs of sockets arranged at right angles to each other and having parallel walls providing bearing surfaces and outwardly diverging walls providing abutment surfaces, the outer wall of each socket being slotted longitudinally of the socket and having an annular enlargement at its inner end disposed radially of the ball member, a pair of shaft members having longitudinally extending bifurcations adapted to snugly fit between the parallel walls of said sockets, each bifurcation being provided near its extremity with a stud extending outwardly transversely of the shaft member, and a bushing positioned on each stud within said annular slot enlargement whereby said shaft members are pivotally connected to said ball member so that each shaft member may swing in a plane at right angles to the swinging movement of the other member, the parallel walls of said socket serving by engagement with said bifurcations to limit the swinging movements of each shaft member to one plane only.

7. A universal joint, comprising a ball member, two shaft members, means for pivotally connecting said shaft members to said ball member so that each shaft member is adapted to swing relatively to the ball member in one plane only, a sleeve secured to each shaft member and overlapping said ball member, and a ring surrounding said ball member and interposed between the ends of said sleeve members, the outer surface of said ring being curved to permit swinging movement of said sleeves and provided with means to prevent uncovering the joint.

8. A universal joint comprising two shaft members, a ball member, means for pivotally connecting said shaft members to said ball member, a relatively broad ring surrounding said ball member, a sleeve fixed to each shaft member and overlying said ring, the outer surface of the ring being curved to permit swinging movements of said sleeves without uncovering the joint and means for maintaining an overlapped relation between said sleeves and said ring.

9. A universal joint comprising two shaft members, a ball member, and means for pivotally connecting said members, a relatively broad ring surrounding the ball member, the outer surface of said ring being curved concentrically with the curvature of said ball member and having a centrally disposed circumferential flange, and a sleeve member attached to each shaft member and overlying said ring so as to inclose the ball member irrespective of the relative positions of said shaft members.

CARL J. CHRISTENSEN.